United States Patent [19]

Pearce

[11] 4,310,053

[45] Jan. 12, 1982

[54] SOD CUTOFF MECHANISM

[75] Inventor: Richard E. Pearce, Lincoln, Nebr.

[73] Assignee: Outboard Marine Corporation, Waukegan, Ill.

[21] Appl. No.: 146,259

[22] Filed: May 5, 1980

[51] Int. Cl.³ ............................................. A01B 45/04
[52] U.S. Cl. ..................................................... 172/20
[58] Field of Search .......................................... 172/20

[56] References Cited

U.S. PATENT DOCUMENTS

| | | | |
|---|---|---|---|
| 1,732,972 | 10/1929 | Knipfing | 172/20 |
| 2,987,124 | 6/1961 | Hadfield . | |
| 3,387,666 | 6/1968 | Hadfield | 172/20 |
| 3,557,878 | 1/1971 | Schuman . | |
| 3,738,431 | 6/1973 | Gennow . | |
| 3,856,090 | 12/1974 | Haffner | 172/20 |

Primary Examiner—Paul E. Shapiro
Attorney, Agent, or Firm—Michael, Best & Friedrich

[57] ABSTRACT

Disclosed herein is a sod cutter comprising a frame, wheels for movably supporting the frame for travel over the ground, a stripping blade on the frame for stripping a ribbon of sod in response to travel of the frame along the ground, a cutoff blade, a linkage movably mounting the cutoff blade on the frame for blade movement into the ground to transversely sever the sod ribbon, which linkage includes a cooperating roller on the frame and a follower mounted on the linkage and engageable with the roller for guiding cutoff blade movement in a vertical orientation during blade travel in the vicinity of the ground, and a drive on the frame and connected to the linkage for moving the blade into and out of the ground in response to travel of the frame along the ground.

2 Claims, 7 Drawing Figures

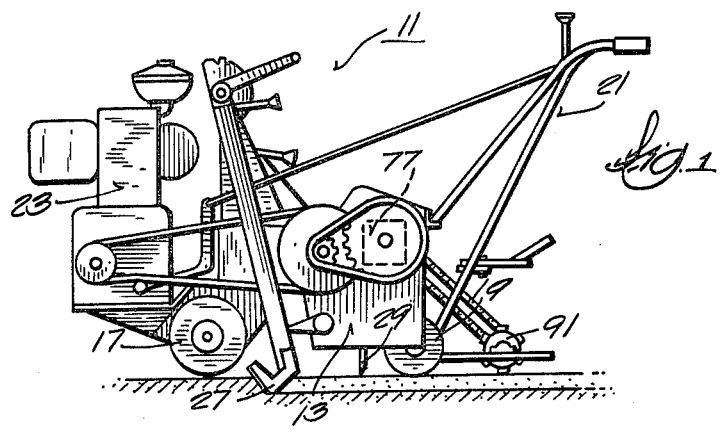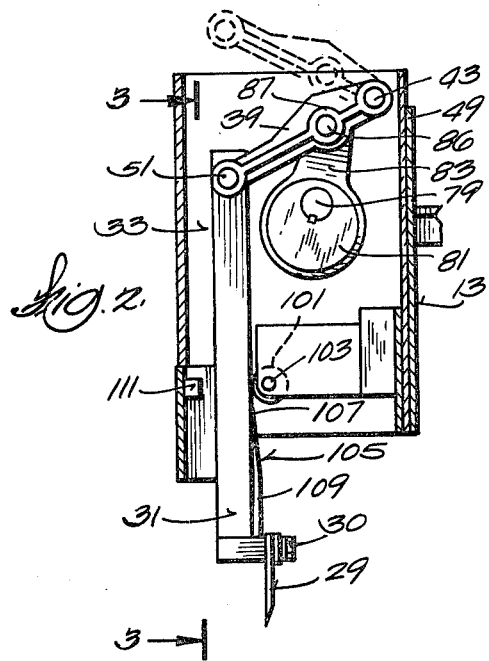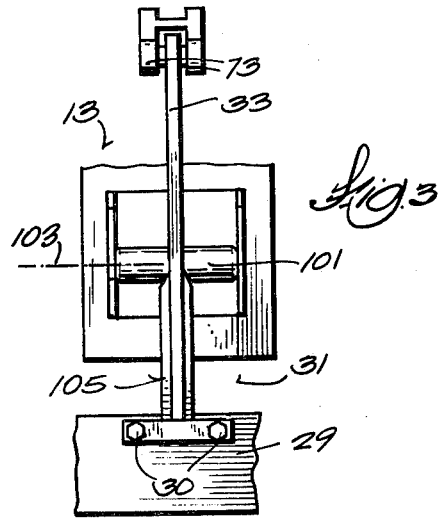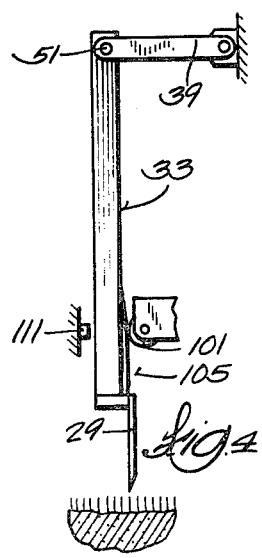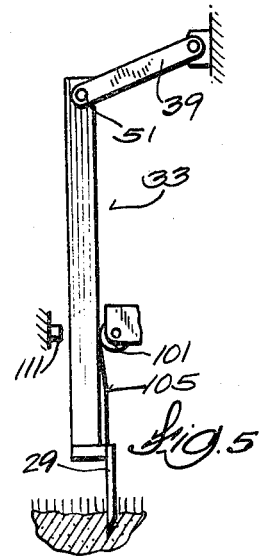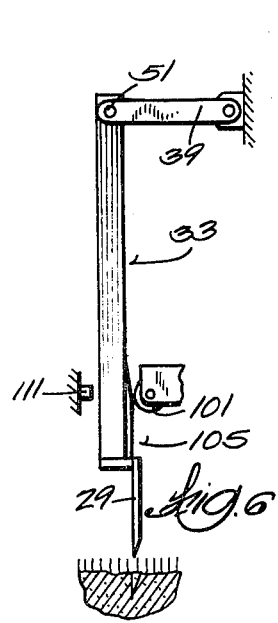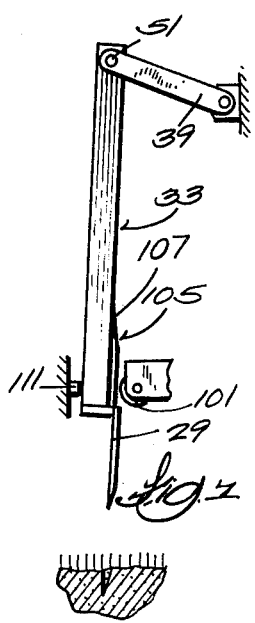

SOD CUTOFF MECHANISM

BACKGROUND OF THE INVENTION

The invention relates generally to sod cutters and more particularly to sod cutters which include a transverse cutoff blade operable to initiate a sod roll, together with mechanism for completing the rolling of a sod roll. Examples of such sod cutting and rolling apparatus are found in the Hadfield U.S. Pat. No. 2,987,124 issued June 6, 1961, and U.S. Pat. No. 3,387,666 issued June 11, 1968, as well as in the Schuman U.S. Pat. No. 3,557,878 issued Jan. 26, 1971.

In the structure disclosed in the Hadfield U.S. Pat. No. 2,987,124 (especially the embodiment of FIGS. 7 and 9) and in the structure disclosed in the Hadfield U.S. Pat. No. 3,387,666, the transverse cutoff blade is employed to initiate a sod roll. Such initiation is caused, as the sod cutter is moving forwardly and while the blade is moving upwardly from the fully extended position in the ground, by generally restricting the blade from material rearward pivotal movement and thereby causing the cutoff blade to plow the cut sod forwardly into the beginning of a roll.

The Gennow U.S. Pat. No. 3,738,431 discloses a four bar linkage for guiding movement of the cutoff blade.

SUMMARY OF THE INVENTION

The invention provides a sod cutter comprising a frame, means for movably supporting the frame for travel over the ground, means on the frame for stripping a ribbon of sod in response to travel of the frame along the ground, a cutoff blade, means movably mounting the cutoff blade on the frame for blade movement into the ground to transversely sever the sod ribbon, which means movably mounting the cutoff blade includes cooperating cam means on one of the blade and the frame and follower means engageable with the cam means on the other of the blade and the frame for guiding cutoff blade movement in a vertical orientation during blade travel in the vicinity of the ground, and means on the frame and connected to the blade for moving the blade into and out of the ground in response to travel of the frame along the ground.

Other features and advantages of the invention will become known by reference to the following description, appended claims, and accompanying drawings.

DRAWINGS

FIG. 1 is a side elevational view of a sod cutter embodying various of the features of the invention.

FIG. 2 is a view, partially in section, of a portion of the mechanism included in the sod cutter shown in FIG. 1.

FIG. 3 is a fragmentary view taken generally along line 3—3 of FIG. 2.

FIG. 4 is a schematic view of the cutoff mechanism which is embodied in the sod cutter shown in FIG. 1 and which is shown in the half-stroke position.

FIG. 5 is a schematic view similar to FIG. 4 showing the cutoff mechanism in the position of full insertion into the ground.

FIG. 6 is a schematic view similar to FIG. 4 showing return of the cutoff mechanism to the half-stroke position.

FIG. 7 is a schematic view similar to FIG. 4 illustrating the cutoff mechanism in the fully raised position.

Before explaining at least one embodiment of the invention in detail, it is to be understood that the invention is not limited in its application to the details of the construction and arrangements of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Shown in FIG. 1 is a sod cutter 11 which includes a frame 13 supported at the front by a traction wheel 17 and supported at the rear by a transversely spaced pair of wheels 19. The sod cutter 11 can be guided for travel over the ground by a handle structure 21 mounted on the frame 13.

Supported on the frame 13 is an internal combustion engine 23 which, through a suitable drive arrangement, powers the traction wheel 17 and also drives a generally horizontally reciprocable sod stripping blade 27 operable to cut a ribbon or elongated strip of sod.

The sod cutter 13 also includes a generally planar transverse cutoff knife 29 which is movable between a retracted position spaced from the ground and an extended position in the ground to effect transverse severance of the sod ribbon into pieces of predetermined length. The transverse cutoff knife 29 also operates to initiate a sod roll which is completed by a mechanism located to the rear of the transverse cutoff knife and which, in general, is not shown. Various arrangements can be employed for completing the rolling of the sod. One such arrangement is disclosed in the Hadfield U.S. Pat. No. 3,387,666 and another arrangement is disclosed in the Schuman U.S. Pat. No. 3,557,878.

Means are provided for mounting the cutoff blade 27 on the frame 13 such that the cutoff blade 27 is movable into and out of the ground in response to travel of the frame 13 along the ground. While various arrangements can be employed, in the disclosed construction, the cutoff blade 27 is secured, by suitable bolts 30, to a lower end portion 31 of a cutoff blade holder or support bar 33. In turn, the holder 33 is supported from the frame 13 by an upper rocker arm 39 which is pivotally mounted (See FIG. 2) at 43 to a portion 49 of the frame 13 and which is pivotally connected at 51 to the cutoff blade holder 33 between spaced bosses 73.

Means are connected to the rocker arm 39 for oscillation thereof relative to the frame 13 in response to travel of the sod cutter 11 along the ground and so as thereby to move the cutoff blade 29 into and out of the ground. While other arrangements can be employed, in the disclosed construction, such means includes a one revolution clutch 77 (shown in dotted outline in FIG. 1), which clutch 77 is supported by the frame 13 and drivingly connected to the engine 23 by suitable means. While other types of clutches can be employed, the disclosed construction contemplates a clutch of the type disclosed in the Kindlein U.S. Pat. No. 3,061,059 issued Oct. 30, 1962, which patent is incorporated herein by reference.

More specifically, as shown in FIG. 3 of the drawings, the clutch 77 includes an output shaft 79 (referred to by numeral 10 in FIG. 1 of the Kindlein patent), which shaft 79 has fixed thereto an eccentric drive including an eccentric 81 (referred to by the numeral 21 in FIG. 1 of the Kindlein patent), which eccentric 81 is received within a bore of a pitman or drive member 83 (referred to by the numeral 43 in FIG. 1 of the Kindlein patent). In turn, the drive member 83 is, at its upper end, pivotally connected at 86 to an intermediate portion 87 of the upper rocker arm 39 (referred to by the numeral 44 in FIG. 1 of the Kindlein patent). It will be further noted that the Kindlein fulcrum pin 45 (shown in FIG. 3 of the Kindlein patent) corresponds to the pivotal connection 43 disclosed herein between the upper rocker arm 39 and the frame 13 and that the Kindlein bearing member 47 (shown in FIG. 3 of the Kindlein patent) corresponds to the pivotal connection 51 disclosed herein between the upper rocker arm 39 and the upper end of the cutoff blade holder 33.

The one-way clutch 77 is tripped or caused to operate by reason of the travel over the ground of a metering wheel 91 (See FIG. 1) which is connected to the clutch 77 in a conventional manner so as to cause clutch operation which effects transverse sod severance by the cutoff blade 29 into sod pieces of uniform length. The one-way clutch 77 and its connection to the engine 23 and to the metering wheel 91, together with the eccentric 81, the pitman 83, and the upper rocker arm 39 have been commercially employed in the past.

Cooperating cam and follower means are provided on the cutoff blade 29 and on the frame 13 for guiding movement of the blade 29 in a vertical orientation during blade movement into and out of the ground or sod. While various arrangements can be employed, in the disclosed construction, such cam and follower means comprises a cam in the form of a roller 101 mounted on the frame 13 for rotation about a stationary axis 103 transverse to the direction of intended sod cutter movement, and a follower 105 mounted on the cutoff blade support bar 33 in position for engagement with the roller 101 so as to guide blade movement in a vertical orientation during blade travel into and out of the ground or sod.

In this regard, the follower 105 on the cutoff blade support bar 33 includes a cam surface with an upper part 107 which approximates the lower half of the arcuate path of the pivotal connection 51 at the outer end of the rocket arm 39. In addition, the follower 105 includes a generally straight lower part 109 which extends vertically when the support bar 33 is vertical. In operation, as the sod cutter 11 moves to the left from the half-stroke position shown in FIG. 4, the upper part 107 of the follower 105 engages against the roller 101 to locate or control disposition of the cutoff blade 29 in a vertical orientation during travel toward and into the ground.

As the cutoff blade 29 moves toward and into the ground, it begins to move rearwardly relative to the frame 13 while in a vertical orientation and continues such rearward and downward movement during penetration into the ground to sever the sod strip while the frame 13 is continuously moving forwardly.

Upon upward movement of the cutoff blade 29 from its lowermost or exended position shown in FIG. 5, the cutoff blade 29 remains in a vertical orientation, moves forwardly relative to the frame 13, and assists in plowing or flipping over the end of the sod so as to initiate a sod roll.

In order to limit forward swinging movement of the cutoff blade 29 in a vertical plane parallel to the path of sod cutter movement, a stop 111 is mounted on the frame 13 in forwardly spaced relation from the roller 101 and in position to engage the cutoff blade support bar 33 so as thereby to prevent excessive pivotal movement of the cutoff blade support bar 33 away from the roller 101 when the cutoff blade 29 travels between its half-stroke position shown in FIGS. 4 and 6 and its fully raised positions shown in FIG. 7.

Various of the features of the invention are set forth in the following claims.

I claim:

1. A sod cutter comprising a frame, means for movably supporting said frame for travel over the ground, means on said frame for stripping a ribbon of sod in response to travel of said frame along the ground, a cutoff blade, a rocker arm pivotally supported at one end by said frame and having a second end, a support bar carrying said cutoff blade and being pivotally connected to said second end of said rocker arm so as to effect sod-cutting movement of said cutoff blade in response to pivotal movement of said rocker arm, means for guiding movement by said cutoff blade so as to obtain, during forward travel of said frame along the ground and in response to arcuate rocker arm movement, generally vertical cutoff blade movement, retention of said cutoff blade in a vertical orientation during vertical cutoff blade movement in the vicinity of the ground, and rearward movement of said cutoff blade relative to said frame during downward movement of said cutoff blade, said means being located on said support bar intermediate said cutoff blade and said pivotal connection to said rocker arm and on said frame rearwardly of said support bar, and including a camming surface, and a roller positioned to engage said camming surface so as to guide cutoff blade movement, and means on said frame and connected to said rocker arm for pivotally moving said rocker arm so as to move said blade into and out of the ground to transversely sever the sod ribbon in response to travel of said frame along the ground.

2. A sod cutter in accordance with claim 1 wherein said sod cutter further includes a stop carried by said frame in forwardly spaced relation from said support bar and in position for engagement with said support bar to limit forward pivotal movement of said support bar.

* * * * *